May 5, 1964 A. F. KNIGHT 3,131,708
AUTOMATIC SWITCHING ASSEMBLY FOR MANIFOLDS
Filed Aug. 8, 1962 3 Sheets-Sheet 1
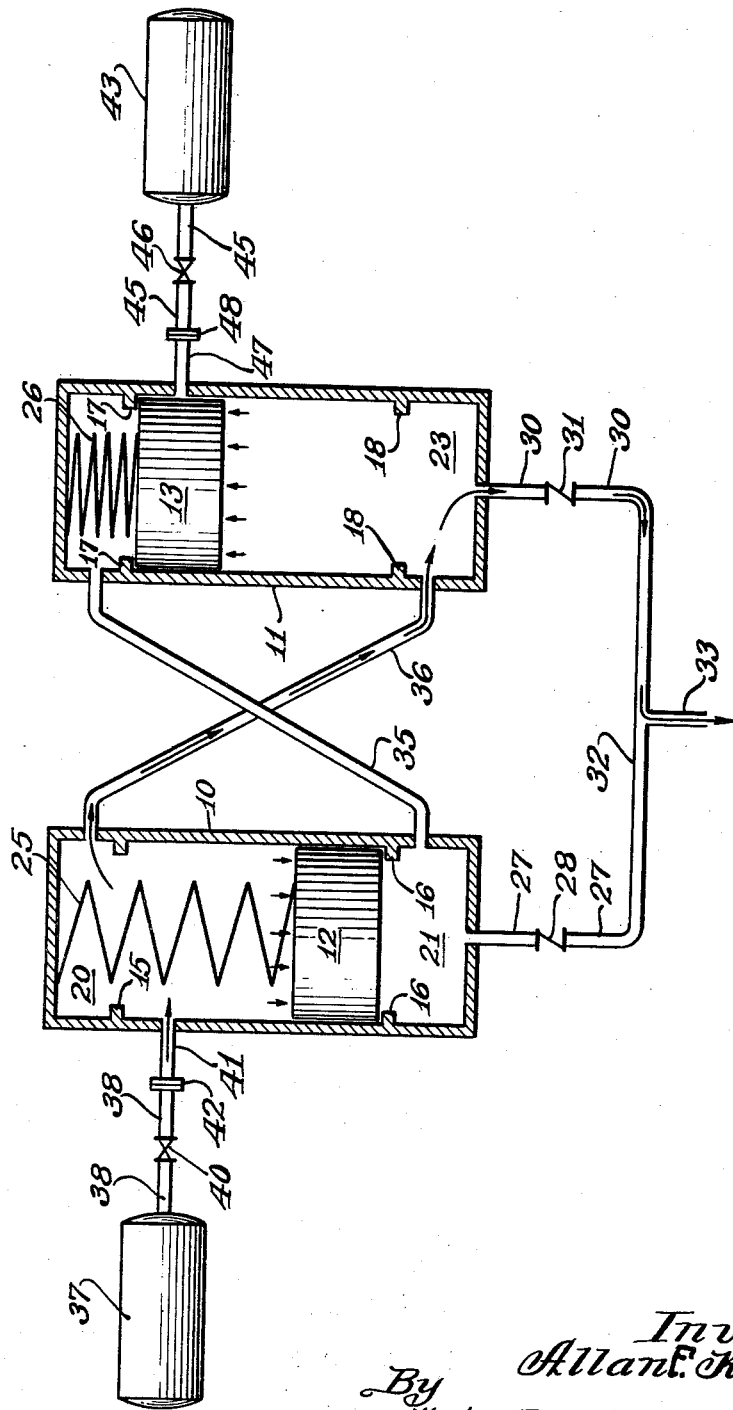
Inventor:
Allan F. Knight
By
Horton, Davis Brewer & Brugman
Attys.

May 5, 1964 A. F. KNIGHT 3,131,708
AUTOMATIC SWITCHING ASSEMBLY FOR MANIFOLDS
Filed Aug. 8, 1962 3 Sheets-Sheet 2
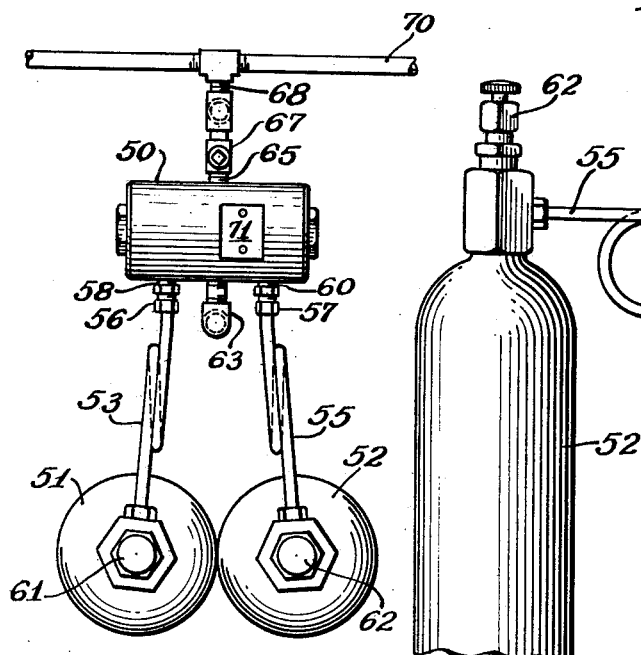
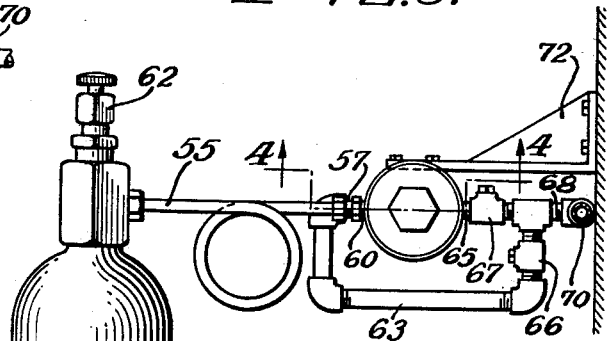
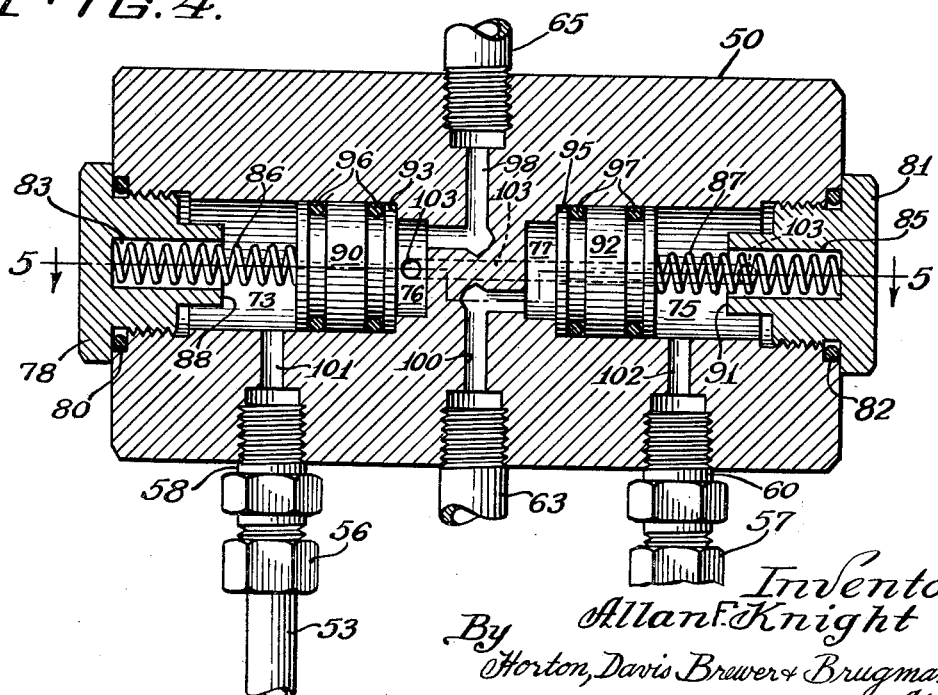

May 5, 1964

A. F. KNIGHT 3,131,708

AUTOMATIC SWITCHING ASSEMBLY FOR MANIFOLDS

Filed Aug. 8, 1962

Inventor:
Allan F. Knight
By Horton, Davis, Brewer & Brugman
Attys.

United States Patent Office 3,131,708
Patented May 5, 1964

3,131,708
AUTOMATIC SWITCHING ASSEMBLY FOR MANIFOLDS
Allan F. Knight, Westhill, Ontario, Canada, assignor to The Matheson Company, Inc., East Rutherford, N.J., a corporation of New Jersey
Filed Aug. 8, 1962, Ser. No. 215,664
4 Claims. (Cl. 137—113)

This invention relates to an automatic switching assembly for pressure vessels, and particularly to a combination of elements for automatically changing the high pressure gas source supplying a line or manifold when the pressure of the source being used becomes too low.

Although this invention is not limited to any special use, it is particularly well adapted for use with high pressure gas that is supplied to the consumer in pressure vessels which are usually known as cylinders but which will be referred to in this application as vessels. Huge quantities of this gas are consumed both in laboratories and in industry for a multitude of widely diversified purposes. By way of example only, liquified petroleum gas used for fuel, carbon dioxide used in carbonating beverages, nitrogen employed to provide inert atmospheres, chlorine for treating water and for bleaching, oxygen and acetylene for welding, ammonia for agricultural purposes and Freon for refrigeration purposes are all uses for high pressure gases in industry where the gases are generally supplied to the user in pressure vessels which must be either replaced or recharged when they become depleted and the pressure within them diminishes. Gas is supplied in pressure vessels at pressures as high as 2000 p.s.i. or more depending on the nature of the gas. The gas is generally regulated down to the pressure at which it is used which is usually much lower than the pressure in the supply vessel. For example, carbon dioxide employed in bottling is generally regulated down to about 75 to 100 p.s.i. while liquified petroleum gas used for fuel may be regulated down as far as four or five inches of water.

A very convenient method of employing gas supplied in pressure vessels is to connect at least two vessels to a manifold which feeds a mutual supply line or another manifold. Only one of the vessels supplies gas, and a continuous gas supply can thus be provided because when the vessel supplying the gas becomes so low in pressure that it must be removed, the other vessel can be opened to the manifold to supply gas and the depleted vessel can be replaced. The changing of vessels on a manifold generally requires an operator to close one valve on the vessel, to close another valve on the manifold, and then to disconnect the vessel from the manifold and connect a full vessel in its place. Although the amount of work involved in replacing a vessel is not great, it does require an operator to be alert for the time when a vessel becomes exhausted to the extent that it needs to be replaced.

It is an object of this invention to provide a device for use with a plurality of vessels which device automatically switches the gas supply from a depleted vessel to a full vessel when the first vessel reaches a predetermined low pressure.

It is another object of this invention to provide a device which permits a plurality of vessels to be connected with their discharge valves open, but which permits gas to flow from only one of said vessels until that vessel becomes depleted to a predetermined extent, and then to automatically seal the depleted vessel and open the charged vessel so that it supplies the gas being used.

It is another object of this invention to provide an automatic switching assembly that permits disconnecting pressure vessels without the necessity for manually closing a valve in the switching assembly.

These and other objects are provided by the automatic switching assembly of this invention which includes two identical cylinders each of which contains a free piston working in the usual gas-tight sliding relationship with the inside of the cylinder. Each piston operates between two end positions, and each cylinder has a gas supply inlet located in its side so that the inlet is sealed by the piston when the piston is in one end position, but uncovered by the piston when the piston is in the other end position. Each cylinder also contains a spring or other force exerting means that tends to urge the piston in the direction that uncovers the gas inlet to the cylinder.

On the side of the piston opposite the gas inlet there are two ports, one leading to a gas outlet that connects with a line or manifold that conducts gas to its point of consumption, and the other port being the terminal of an interconnecting channel that provides open communication to the portion of that other cylinder corresponding to the opposite side of the piston. The interconnecting channels perform the dual function of supplying control pressure to the pistons and conducting the gas that is being discharged into the manifold. As such, the gas entering the inlet port of one cylinder will pass into the manifold from the outlet port of the other cylinder and vice versa.

Briefly, this arrangement of elements operates as follows. In a position of rest, the pistons in both cylinders are forced by their springs to a position where the gas inlet port is uncovered. When gas is supplied at high pressure from a pressure vessel to flow into one of the inlet ports, it flows into the first cylinder below the first piston, passes through the interconnecting channel to the second cylinder above the second piston and flows out of the outlet port into the manifold from the second cylinder. The high pressure in the vicinity of the outlet port of the second cylinder causes the second piston to compress the spring, move to its lowermost position and seal the gas inlet port into the second cylinder. When the pressure vessel connecting to the second cylinder inlet port is opened, the piston in the second cylinder prevents the gas in the second pressure vessel from entering the switching assembly and thereby from entering the manifold. Gas from the first cylinder will continue to flow into the manifold until the pressure in the first pressure vessel becomes so low that the force it exerts above the second piston is insufficient to overcome the force exerted by the spring beneath the second piston. The second piston will then move to uncover the inlet port in the second cylinder and gas from the second pressure vessel will pass beneath the second piston, through the interconnecting channel and into the first cylinder above the first piston. This gas is at a relatively high pressure compared with that in the depleted vessel, and it will cause the first piston to compress its spring, to move downwardly and to cover the inlet port from the first pressure vessel thereby sealing the first pressure vessel from the manifold. At this point the first pressure vessel may be removed and replaced. The fresh vessel will be prevented from discharging into the manifold by the first piston until the second pressure vessel has become so depleted that the pressure of the gas discharging from it is insufficient to overcome the spring force working on the first piston and the switching operation just described will be reversed.

The pressure at which the automatic switch from one vessel to another takes place may be predetermined by relating the diameter of the piston and therefore the force exerted by the pressure, to the strength of the spring or other restoring force.

This invention may be best described with reference to the accompanying drawings which illustrate several embodiments of the invention and are intended as being illustrative rather than limiting on its scope.

FIG. 1 is a schematic drawing showing the principal parts of the device of this invention and their functional realtionship;

FIG. 2 is a plan view of a device embodying this invention having the elements incorporated into a single compact body;

FIG. 3 is a side elevation view of the embodiment illustrated in FIG. 2;

FIG. 4 is a sectional view of the embodiment of FIG. 2 taken along the line 4—4 in FIG. 3;

FIG. 5 is a sectional view taken along the line 5—5 in FIG. 4 showing the various parts in a neutral position;

FIG. 6 is the same view as FIG. 5, but showing the parts in position they would occupy during operation; and FIG. 7 is a sectional view taken along the line 7—7 in FIG. 5.

In FIG. 1 there is shown schematically the various elements constituting this invention and their relationship to each other. A cylinder 10 and a cylinder 11 contain pistons 12 and 13, respectively. Piston 12 operates between stops 15 and 16 while piston 13 operates between stops 17 and 18. The cylinder 10 has an upper head space 20 and a lower head space 21 set off by the stops while cylinder 11 has an upper head space 22 and a lower head space 23 similarly set off. Cylinder 10, as shown, is also equipped with a spring 25 while cylinder 11 is equipped with a spring 26, said springs operating between the upper closure and the piston in each cylinder and tending to force the pistons downwardly.

The lower head space 21 has a discharge conduit 27 passing from it through a check valve 28. The lower head space 23 contains a discharge conduit 30 which has a check valve 31 in it and both discharge conduits 27 and 30 feed a common line or manifold 32 which discharges into a single conduit 33 for supplying the ultimate user of the gas with a continuous supply. The conduit 33 may contain conventional pressure regulating means, which are not shown, for reducing the pressure of the gas to the pressure desired in the process employing it.

The cylinders 10 and 11 are interrelated also through interconnecting conduits. Interconnecting conduit 35 provides an open communication between lower head space 21 of cylinder 10 and upper head space 22 of cylinder 11, while interconnecting conduit 36 provides open communication between upper head space 20 of cylinder 10 and lower head space 23 of cylinder 11.

Cylinder 10 is supplied with gas at high pressure from pressure vessel 37 which discharges through line 38 and valve 40. Line 38 is connected to inlet 41 of cylinder 10 through a coupling 42. Similarly, a pressure vessel 43 discharges through line 45 and valve 46 into inlet 47 of cylinder 11, and inlet 47 is connected to line 45 through coupling 48. Pressure vessels 37 and 43 are ordinarily what are termed gas cylinders which supply gas at extremely high pressure, and although shown in FIG. 1, as being very small compared with the switching device, these vessels are actually very large compared to the switching device which may be contained in a single housing perhaps two to three inches in diameter and five to six inches long.

To place the device illustrated in FIG. 1 in operation, it is first necessary to connect pressure vessels 37 and 43 to it with couplings 42 and 48. Before any gas is passed through the device, it is in a neutral position with both piston 12 and piston 13 forced by springs 25 and 26 to rest against lower stops 16 and 18, respectively. This is the inoperative position. To place the device in operation, the valve of first one pressure vessel, and then the other is opened. As illustrated in FIG. 1, pressure vessel 37 was opened first.

When valve 40 is opened, gas flows as illustrated by long arrows through line 31 and into the portion of cylinder 10 above piston 12. Gas pressure augments the force of spring 25 and presses piston 12 more firmly against stop 16. The piston 12 forms a seal with the side walls of cylinder 10 and it may also seal against stop 16 to prevent the high pressure gas from entering lower head space 21. The small arrows indicate pressure being exerted in the direction of the arrow heads but with no flow of gas. The gas entering cylinder 10 from vessel 37 passes into upper head space 20, through interconnecting conduit 36 and into the lower head space 23 of the cylinder 11. The high pressure gas in lower head space 23 exerts a pressure on the bottom of piston 13 forcing it upwardly against stop 17 thereby compressing spring 26. The inlet opening of conduit 47 is located to be sealed by piston 13 when piston 13 is against stop 17 or in operative position. The gas entering lower head space 23 passes through conduit 30, check valve 31 and conduit 32 and discharges through line 33 where its pressure is regulated and it passes to its ultimate use.

Check valve 28 prevents any high pressure gas from passing through line 27 into lower head space 21 so that there is no equalization of pressure on both sides of the piston 12.

All of the foregoing takes place practically instantly when valve 40 is open. Thus, valves 40 and 46 may be opened almost simultaneously without hampering the operation of the switching assembly. Opening of valve 46 places pressure vessel 43 available for use but no gas flows from it because inlet 47 is sealed by piston 13.

In the position illustrated, gas from vessel 37 will flow but gas from vessel 43 will not; however, at some point the gas from vessel 37 will become so exhausted that the pressure in vessel 37, which is substantially the same as the pressure in head space 20, interconnecting conduit 36, and head space 23, will be too small to overcome the force of spring 26. When this point is reached, spring 26 will expand pushing piston 13 downwardly toward stop 18, and when piston 13 has moved sufficiently to uncover inlet 47, the relatively high pressure gas in vessel 43 will push piston 13 rapidly down against stop 18. When this happens, the high pressure gas in vessel 43 will also enter head space 22, it will pass through interconnecting conduit 35 into head space 21 and it will force piston 12 upwardly compressing spring 25 until piston 12 rests against stop 15. In this position, the piston 12 seals the inlet 41. Additionally, the high pressure gas from vessel 43 will pass through outlet conduit 27, check valve 28, and from there it will enter the manifold 32 to supply a continuous flow of gas to the supply line 33.

When the gas is supplied from vessel 43, coupling 42 may be broken and pressure vessel 37 replaced without any loss of gas from the device in that the piston 12 will prevent a loss of gas from inlet 41. When a new pressure vessel 37 is connected to coupling 42, its valve 40 may be opened and the vessel will be ready to become operative when the gas supply in vessel 43 is so exhausted that the reverse process will cause piston 12 to descend and piston 13 to rise. The gas flow then will be as originally pictured.

Although illustrated schematically as a group of conduits, pistons, and cylinders in FIG. 1, the switching device of this invention may be in the form of a unitary compact housing containing most or all of the elements of the invention within the housing. In FIGS. 2–7, there is illustrated such a commercial embodiment. In FIG. 2, the housing 50 is shown connected to pressure vessels 51 and 52 through supply conduits 53 and 55, respectively. The supply conduits as pictured are bent into a loop in what is known in the art as a pigtail to provide flexibility for ease in making connections to the manifold. Conduit 53 is connected at coupling 56 while conduit 55 is connected at coupling 57 to provide communication with inlet 58 and inlet 60 respectively. The pressure vessels 51 and 52 are provided with valves 61 and 62, respectively, so that they may be independently sealed before removal.

As shown in FIG. 3, the switching device of this invention also contains outlet conduits 63 and 65 having appropriate fittings, and containing check valves 66 and 67, respectively. The outlets merge into a common line 68 and pass into a manifold 70 which supplies gas to the ultimate point or points of consumption, generally through a pressure regulator which is not shown. The cylindrical housing 50 has a flat portion 71 formed on its periphery to facilitate installation with a bracket such as the wall bracket 72.

FIG. 4 is a sectional view illustrating the internal configuration of the housing 50 taken along the line 4—4 in FIG. 3. A cylinder 73 is drilled into one end of the housing 50 and a cylinder 75 is drilled into the opposite end. At each end a radially contracted head space is drilled, the head space 76 forming a terminal portion of cylinder 73 and the head space 77 forming the terminal portion of cylinder 75. The cylinder 73 is closed at the other end with a cap 78 that is threaded into place and sealed with a gasket 80 while the cylinder 75 is similarly closed with a cap 81 sealed with a gasket 82. In this embodiment, the cap 78 has a cavity 83 and cap 81 has a cavity 85, said cavities forming guides to contain springs 86 and 87, respectively. The end surface 88 of cap 78 acts as a stop for the piston 90 and the end surface 91 of the cap 81 acts as a stop for the piston 92 that rides in cylinder 75. The shoulder 93 that naturally results from the reduced radius head space 76 forms the other stop for the piston 90 in cylinder 73 while the corresponding shoulder 95 forms the other end stop for piston 92. These stops limit the axial travel of the pistons to the distance between them.

Pistons 90 and 92 are provided with sealing rings 96 and 97, respectively, to insure a substantially gas-tight seal against the side walls of the cylinders 73 and 75, respectively. Head space 76 is connected to outlet channel 98 which discharges into the before-mentioned outlet conduit 65 and head space 77 is connected to outlet channel 100 which discharges into the before-mentioned outlet conduit 63. Inlet conduit 58 connects to inlet channel 101 entering the intermediate portion of cylinder 73 while inlet conduit 60 connects with inlet channel 102 entering the intermediate portion of cylinder 75.

The head space 76 is connected to a portion of cylinder 75 below the stop 91 through interconnecting channel 103 which is shown dotted as a channel drilled through the body 50. It may be noted that for convenience in manufacture, the inlet and outlet channels lie in the same plane while the interconnecting channels lie in a plane 90° from the plane of the inlet and outlet channels. This provides ease in assembly in that all connections lie either 90° or 180° from each other and it provides ease of manufacture in that there is less problem with internally bored channels intersecting each other.

FIGS. 5 and 6 are both views taken along the line 5—5 of FIG. 4 which illustrate the interconnecting channels and which illustrate the devices of this invention in neutral position and in operating position. In FIG. 5, the interconnecting channel 103 that provides open communication between head space 76 and the bottom portion of cylinder 75 may be seen more clearly as well as the corresponding channel 105 providing communication between cylinder 73 and head space 77. These channels are formed of intersecting straight bores through the main body. The portions of the channel that intersect the outside surface of housing 50 are threaded and sealed with plugs 106 so that channels 105 and 103 provide only communication between various portions of the cylinders rather than to the outside of the housing. When not in use, the switching device is as illustrated in FIG. 5, with springs 86 and 87 extended and forcing pistons 90 and 92 into contact with shoulders 93 and 95, respectively. Inlet 101 and inlet 102 are both uncovered, and both pistons are in inoperative positions. To place the device in operation, pressure vessels 51 and 52 are connected to inlet conduits 58 and 60, respectively, and both pressure vessels are placed in operation by opening valves 61 and 62, respectively. Even if the valves 61 and 62 are opened substantially simultaneously, whichever vessel provides the first strong surge of pressure will be the one that is first placed in operation. For purposes of this explanation, vessel 51 is open first immediately after which vessel 52 may be opened. As soon as vessel 51 is open, the assembly moves to its operating position as illustrated in FIG. 6. Gas under pressure enters inlet 101 filling cylinder 73 and pushing piston 90 even more firmly against shoulder 93 as indicated by the short arrows. The high pressure gas in cylinder 73 passes through interconnecting conduit 105 and enters head space 77 so that head space 77 is under substantially the same high pressure as the gas in the pressure vessel 51. This pressure acting in the direction of the small arrows against piston 92 forces piston 92 into operative position against shoulder or end surface 91 of the cap 81 and at the same time it compresses the spring 87 and seals inlet 102 so that no gas can enter cylinder 75 through inlet 102 from pressure vessel 52. The gas in head space 77 flows through outlet conduit 100 which, as hereinbefore explained, leads to outlet 63 and eventually into line 68 and manifold 70. The gas in line 68 and manifold 70 cannot enter channel 98 and head space 76 because check valve 67 (as shown in FIG. 2) prevents the reverse flow of gas through this line. As long as the pressure in vessel 51, which is the same pressure substantially as the pressure in cylinder 75, creates sufficient force against piston 92 to maintain spring 87 compressed, the gas in vessel 51 will flow through the switching device and into manifold 70.

When the pressure in vessel 51 is inadequate when acting against piston 92 to keep spring 87 compressed, spring 87 forces piston 92 toward shoulder 95 and in so doing, it uncovers inlet 102 and releases gas from vessel 52 into cylinder 75. This gas is at substantially higher pressure than the gas in vessel 51 and as a result, it flows through interconnecting channel 103 into head space 76 and forces the piston 90 toward end surface 88 thereby compressing the spring 86 and covering inlet 101. At that point, the high pressure gas in head space 76 passes through outlet 98 and into conduit 65 which, as shown in FIG. 3, passes through check valve 67, line 68 and ultimately into manifold 70. Now the vessel 51 may be disconnected and a freshly charged vessel 51 recoupled at coupling 56 to the device and the valve 61 to the fresh vessel opened so that when the gas supply in vessel 52 becomes depleted the reverse switch-over will again take place and manifold 70 will never be without continuous supply of high pressure gas.

FIG. 7 is an end view taken along the line 7—7 of FIG. 5, and it illustrates more clearly that the inlet and outlet conduits and channels lie in the same plane and that the interconnecting channels 103 and 105 lie in the same plane which is offset 90° from the inlets and outlets.

The unitary compact embodiment shown in FIGS. 2–7 may have the various inlets, outlets and channels differently arranged and still be within the scope of this invention. Many modifications may be employed regarding the size, shape and disposition of the various elements and whether they are internal or external of the housing. For example, outlet channels 98 and 100 may be bored to discharge from the same side of the housing 50, or they may be joined as a common discharge channel within housing 50 in which case check valves such as 66 and 67 would be incorporated within the body of housing 50. Pressure gauges may be installed on the housing to indicate the pressure in the various chambers or channels, indicators may be employed to show which gas source is being used or the position of the pistons, and obviously, many other modifications may be made within the scope of this invention, which should be limited only by the appended claims.

Having thus described the invention, what is claimed is:

1. An automatic switching assembly for changing from one source of high pressure gas to another which comprises a first cylinder containing a first piston provided with sealing rings, a second cylinder containing a second piston provided with sealing rings, both of said first and second pistons operating between operative and inoperative positions, force exerting means in each cylinder tending to urge said pistons toward said inoperative position, supply ports in each cylinder located to be sealed by each piston when it is in operative position and in open communication with said cylinder when said piston is in inoperative position, a discharge conduit containing a check valve opening into each of said cylinders on the side or said pistons opposite said supply ports, said discharge conduits being remote from and uncovered in all positions of said pistons, channel means connecting the supply port side of each cylinder to the discharge conduit side of the other cylinder and means preventing said pistons from sealing said channel means thereby providing open communication in all positions of said pistons.

2. The switching assembly of claim 1 further characterized in that said discharge conduits from said cylinders pass into a common discharge line downstream of said check valves.

3. A unitary automatic switching assembly for a manifold which comprises a main housing, cylinders formed in opposed ends of said housing, an end head in gas-tight relation with said housing on each end thereof forming a closure for said cylinders, a free piston having sealing rings being in gas-sealing relationship within each cylinder, a compression spring placed between said end head and said piston in each cylinder to urge said cylinder into said housing, gas supply ports through said housing intersecting said cylinders at locations to be uncovered by said pistons when said springs are extended and covered by said pistons when said springs are compressed, discharge conduits uncovered in all positions of said pistons containing check valves passing from the end of said cylinders opposite said end heads, channel means through said housing opening into said cylinders connecting the portion of each cylinder adjacent said end head to the portion of the other cylinder adjacent said discharge conduit, and means preventing the pistons from sealing the channel means in all positions of said pistons.

4. The assembly of claim 3 further characterized in which said last named means includes stops formed in said cylinders to limit the travel of said pistons, and said discharge conduits and the openings into said channels all lie on a side of said stops opposite said pistons.

References Cited in the file of this patent

UNITED STATES PATENTS

| | | |
|---|---|---|
| 2,354,286 | Whaley | July 25, 1944 |
| 2,517,061 | Von Stackelberg | Aug. 1, 1950 |

FOREIGN PATENTS

| | | |
|---|---|---|
| 1,222,927 | France | Jan. 25, 1960 |